United States Patent Office 2,842,434
Patented July 8, 1958

2,842,434
METHOD OF PRODUCING CRUDE IRON

Otto Kippe, Osnabruck, Germany, assignor to Paul O. Tobeler, doing business under the name of Trans-Oceanic, Los Angeles, Calif.

No Drawing. Application July 11, 1955
Serial No. 521,397

7 Claims. (Cl. 75—2)

This invention relates generally to the beneficiating of iron-bearing raw materials to render them more effective for smelting, such beneficiating including improving the physical form and properties of the materials such as lumping of the materials and enrichening leaner iron ores. More particularly, the invention concerns the use of the iron-oxide containing material known as "red sludge," produced as a by-product from treatment of bauxite ore to produce alumina, in the processing of lean iron ores and especially acid ores. Further, the invention relates to the use of red sludge in the beneficiating of ore fines and blast furnace flue dust, and the processing of titanium bearing iron ores to increase the recoverable titanium content of the slag produced in conjunction with iron recovery from such ores.

In the commercial treatment of bauxite ore to produce alumina, the bauxite, containing oxides of aluminum, iron, silica and titanium, is mixed with an aqueous solution of sodium hydroxide and subjected to fine grinding and to filtering, during which dissolved aluminite comprising $NaAl(OH)_4$ is separated from the undissolved iron-containing residue commonly known as "red sludge." As an example illustrative of this process, 100 kilograms of ground, iron containing bauxite may be treated with 1,500 kilograms of 45% caustic soda solution in a rotary digester at 170 degrees centigrade and 6 to 8 atmospheres pressure to produce dissolved alumina and insoluble material, which upon filtration and washing forms red mud. From 28 tons of bauxite ore up to 21 tons of undissolved red sludge are obtained as a by-product, which is normally wasted. When dried the sludge yields up to 12 tons of solids having the following dry composition:

| | Percent |
|---|---|
| $Fe_2O_3$ | 42–50 |
| $Al_2O_3$ | 13–22 |
| $SiO_2$ | 7–8 |
| $TiO_2$ | 5–7 |
| $Na_2O$ | 5–9 |

It has now been found that red sludge has considerable value in the treatment of certain types of low grade iron-containing materials normally unacceptable for smelting. With respect to low grade iron ores having a high silica and a low iron content, the red sludge is found useful in beneficiating the ore for smelting, during which the red sludge not only acts as a flux to promote formation of acid slag from the high silica gangue, but also has the effect of reducing the sulfur content of the molten pig iron. Furthermore, the high proportion of iron in the red sludge increases the iron yield resulting from smelting of the lean ore.

Examples of such lean ores, which are not at the present time considered commercially useful by themselves for the production of pig iron include Taconite ore found in the United States, and certain representative ores found at Salzgitter in Germany containing about 26 percent iron and 32 percent silica, at Frodingham, England, having about 25 percent iron and 9 percent silica and at Corby, England, having about 32.5 percent iron and 14.7 silica. To such iron-lean acid ore may be added a quantity of red sludge such that the blast furnace slag resulting has a $Na_2O$ content of about 2.5 percent. For this purpose, between 8 and 15 weight parts of dried red sludge may be admixed with 100 weight parts of ore prior to charging into the blast furnace, or the dried sludge may be charged directly into the furnace for reaction with the ore. Since the red sludge conveniently dries in pellet or lump form, it may be utilized in this condition without further processing.

The use of red sludge is particularly applicable to the smelting of low grade silicious ores containing between 25 and 30 percent iron and between 10 percent and 30 percent silica, since the amounts of limestone and coke that would otherwise be necessary for smelting are substantially reduced.

Example

A burden containing 3500 lbs. iron ore with 30% Fe and 29% $SiO_2$,
300 lbs. dried "red sludge" in lumps,
1150 lbs. lime stone, and
1535 lbs. coke yields in the acid blast furnace method 1000 lbs. raw iron and
2240 lbs. slags with 42% $SiO_2$, 16% $Al_2O_3$, 34% CaO and 2.4% $Na_2O=CaO/SiO_2=0.79$.

The red sludge may be similarly used in beneficiating ore fines, typically resulting from washing and sizing of iron ores, either by themselves or in conjunction with blast furnace flue and coke dust. Thorough mixing of the ore fines with red sludge and water results after drying of the moist mix in the production of pellets or lumps which may be directly charged into the furnace, an alternatively the mix may be formed into briquettes of larger size for charging into the furnace. Proportionally between 15 and 25 weight parts of moist red sludge may be added to 100 weight parts of the ore fines and subsequently thoroughly mixed therewith in suitable mixing equipment.

Mixing of the red sludge with ore fines together with blast furnace flue dust, coke dust, and a small quantity of water results in the production of an improved mineral mix which may be sintered at elevated temperatures to form lumps suitable for charging into the blast furnace. By the addition of red sludge, the sintered product is made more acceptible for smelting than normally sintered ore fines and flue and coke dust since the product reacts during smelting to promote slag formation. Between 15 and 25 weight parts of red sludge are desirably added to 100 weight parts of the fines and dust to form the mix. Before the red sludge is added, a typical mixture of ore fines with coke and blast furnace flue dust may have an iron content between 25.3 and 36.4 percent, a silica content of between 12.9 and 19.10 percent, and a lime content between 12.5 and 16.7 percent.

Example

A mineral mixture is prepared containing 80 pounds ore fines, 13 pounds blast furnace flue dust and 7 pounds coke dust. To this mixture are added 20 pounds of moist red sludge, and after thoroughly mixing, the resultant materials are sintered between 1 and 4 hours at temperatures between 900 and 1100 degrees centigrade to produce lumps useable for smelting in the blast furnace.

Finally, due to its titanium oxide content, the red sludge may be advantageously smelted in conjunction with titanium-containing iron ores such as Ilmenite to produce a slag which may be further treated to yield titanium. For example, between 10 and 25 weight parts of red sludge may be added to 100 parts of Ilmenite ore, which contains about 35 percent titanium oxide, and the product subjected to smelting in an electric furnace to yield pig iron and titanium oxide rich slag. Thereafter, the slag may be treated with sulfuric acid to produce titanium sulfate, from which pure titanium may be recovered by known processes.

I claim:

1. The method of beneficiating low grade iron ore having a high silica and low iron content to promote slag formation and to increase the yield of pig iron obtained during smelting, that includes drying to lump-form red mud comprising the alkali containing residue obtained by separating a solution of sodium alum from a mixture of iron-containing bauxite ore in aqueous sodium hydroxide, said red mud residue being composed of ferric oxide, alumina, silica, titanium oxide and sodium oxide with said ferric oxide and alumina being present in an amount comprising at least a major portion of the total dry weight of the residue composition, and admixing said lump-form red mud with said low grade ore for reaction therewith during smelting in the absence of metallic aluminum.

2. The method of beneficiating low grade iron ore having a high silica and low iron content to promote slag formation and to increase the yield of pig iron obtained during smelting, that includes drying to lump-form red mud comprising the alkali containing residue obtained by separating a solution of sodium alum from a mixture of iron-containing bauxite ore in aqueous sodium hydroxide, said red mud residue having the following composition:

| | Percent |
|---|---|
| $Fe_2O_3$ | 42–50 |
| $Al_2O_3$ | 13–22 |
| $SiO_2$ | 7–8 |
| $TiO_2$ | 5–7 |
| $Na_2O_3$ | 5–9 | and proportionally admixing between 8 and 15 weight parts of said lump-form red mud with 100 weight parts of said ore for reaction therewith during smelting in the absence of metallic aluminum.

3. An admixture of low grade iron-containing raw materials reactive during smelting at elevated temperatures to yield molten pig iron and to promote acid slag formation, consisting of red mud comprising the alkali containing residue obtained by separating a solution of sodium alum from a mixture of iron-containing bauxite ore in aqueous sodium hydroxide, said red mud residue being composed of ferric oxide, alumina, silica, titanium oxide and sodium oxide with said ferric oxide and alumina being present in an amount comprising at least a major portion of the total dry weight of the residue composition, said red mud being dried to lump-form, and low grade iron ore having a high silica and low iron content, said admixture being substantially free of metallic aluminum.

4. An admixture of low grade iron-containing raw materials reactive during smelting at elevated temperatures to yield molten pig iron and to promote acid slag formation, consisting of proportionally between 8 and 15 weight parts of red mud comprising the alkali containing residue obtained by separating a solution of sodium alum from a mixture of iron-containing bauxite ore in aqueous sodium hydroxide, said red mud residue having the following composition:

| | Percent |
|---|---|
| $Fe_2O_3$ | 42–50 |
| $Al_2O_3$ | 13–22 |
| $SiO_2$ | 7–8 |
| $TiO_2$ | 5–7 |
| $Na_2O_3$ | 5–9 | said red mud being dried to lump-form, and 100 weight parts of low grade iron ore containing between 25% and 30% iron and between 10% and 30% silica, said admixture being substantially free of metallic aluminum.

5. The method of beneficiating iron ore fines and blast furnace flue and coke dust for smelting, that includes admixing said ore fines and flue and coke dust with red mud comprising the alkali containing residue obtained by separating a solution of sodium alum from a mixture of iron-containing bauxite ore in aqueous sodium hydroxide and with sufficient water to form a moist mix, said red mud residue being composed of ferric oxide, alumina, silica, titanium oxide and sodium oxide with said ferric oxide and alumina being present in an amount comprising at least a major portion of the total dry weight of the residue composition, and subjecting said mix to elevated temperatures above 900 degrees centigrade for a time period in excess of one hour sufficient to produce a lump-form sinter.

6. An admixture in sintered form reactive during smelting to yield molten pig iron and to promote acid slag formation, said admixture comprising proportionally between 15 and 25 weight parts of red mud comprising the alkali containing residue obtained by separating a solution of sodium alum from a mixture of aqueous sodium hydroxide, said red mud residue being composed of ferric oxide, alumina, silica, titanium oxide and sodium oxide with said ferric oxide and alumina being present in an amount comprising at least a major portion of the total dry weight of the residue composition, and 100 weight parts of iron ore fines, blast furnace flue dust and coke dust.

7. An admixture of low grade iron-containing raw materials reactive during smelting at elevated temperatures to yield molten pig iron and to promote the formation of acid slag having a recoverable titanium content, comprising proportionally between 10 and 20 weight parts of red mud comprising the alkali and titanium containing residue obtained by separating a solution of sodium alum from a mixture of iron-containing bauxite ore in aqueous sodium hydroxide, said red mud residue being composed of ferric oxide, alumina, silica, titanium oxide and sodium oxide with said ferric oxide and alumina being present in an amount comprising at least a major portion of the total dry weight of the residue composition, said red mud being dried to lump form, and 100 weight parts of Ilmenite ore.

References Cited in the file of this patent

UNITED STATES PATENTS

| 1,760,992 | Palmer | June 3, 1930 |
| 2,416,179 | Kemmer | Feb. 18, 1947 |
| 2,529,344 | Machlet | Nov. 7, 1950 |
| 2,529,345 | Machlet | Nov. 7, 1950 |
| 2,683,675 | Machlet | July 13, 1954 |

UNITED STATES PATENT OFFICE
CERTIFICATE OF CORRECTION

Patent No. 2,842,434                      July 8, 1958

Otto Kippe

It is hereby certified that error appears in the above numbered patent requiring correction and that the said Letters Patent should read as corrected below.

In the grant, lines 1 to 3, for "assignor to Paul O. Tobeler, doing business under the name of Trans-Oceanic of Los Angeles, California," read -- assignor of one-half to Paul O. Tobeler, doing business under the name of Trans-Oceanic, of Los Angeles, California, -- lines 12 and 13, for "Paul O. Tobeler, doing business under the name of Trans-Oceanic, his heirs" read -- Otto Kippe, his heirs or assigns, and Paul O. Tobeler, doing business under the name of Trans-Oceanic, his heirs --; in the heading to the printed specification, lines 3 to 5, for "assignor to Paul O. Tobeler, doing business under the name of Trans-Oceanic, Los Angeles, Calif." read -- assignor of one-half to Paul O. Tobeler, doing business under the name of Trans-Oceanic, Los Angeles, Calif. --.

Signed and sealed this 4th day of November 1958.

(SEAL)
Attest:
KARL H. AXLINE

Attesting Officer

ROBERT C. WATSON
Commissioner of Patents